United States Patent [19]

Pisello et al.

[11] Patent Number: 5,454,098
[45] Date of Patent: Sep. 26, 1995

[54] METHOD OF EMULATING ACCESS TO A SEQUENTIAL ACCESS DATA STORAGE DEVICE WHILE ACTUALLY USING A RANDOM ACCESS STORAGE DEVICE

[75] Inventors: Thomas Pisello, DeBary; Lyle Conn, Lake Mary, both of Fla.

[73] Assignee: Conner Peripherals, Inc., San Jose, Calif.

[21] Appl. No.: 951,602

[22] Filed: Sep. 28, 1992

[51] Int. Cl.$^6$ .................................................. G06F 12/00
[52] U.S. Cl. .......................... 395/500; 364/955; 364/251; 364/252
[58] Field of Search ..................................... 395/500, 725, 395/800

[56] References Cited

U.S. PATENT DOCUMENTS

| | | | |
|---|---|---|---|
| 4,145,745 | 3/1979 | DeBijl | 395/400 |
| 4,161,036 | 7/1979 | Morris | 395/425 |
| 4,541,019 | 9/1985 | Precourt | 360/15 |
| 4,764,895 | 8/1988 | Armstrong | 395/400 |

*Primary Examiner*—David Y. Eng
*Attorney, Agent, or Firm*—Fliesler, Dubb, Meyer & Lovejoy

[57] ABSTRACT

A method of emulating a sequential data storage device on a random access device to permit the transfer of information in a sequential format between a host computer and a random access storage media. Commands for storing information in the sequential format from the host are transformed into commands to store data on the random access media. Commands for retrieving information in a sequential format are provided by the host to retrieve the stored information from the random access media. The commands for retrieving information are transformed into commands that retrieve the data on the random access media. Once the data is retrieved, it is then provided to the host.

9 Claims, 12 Drawing Sheets

METHOD OF EMULATING ACCESS TO A SEQUENTIAL ACCESS DATA STORAGE DEVICE WHILE ACTUALLY USING A RANDOM ACCESS STORAGE DEVICE

BACKGROUND OF THE INVENTION

This invention relates to computer emulation of sequential data storage, and more particularly, to a method for transferring data between a host computer and a random access storage device via sequential access command protocol.

Two types of formats are typically used with computers to store data. One format is referred to as sequential access and the other as random access.

In sequential access format (see FIG. 1), data is stored serially on a sequential media such as a magnetic tape in sets of data blocks, each block typically comprising 512 bytes. Between each set of data blocks is an overhead media area which contains such information as a file mark. Associated with each set of data blocks is identification information and a cyclic redundancy check (CRC). The file mark indicates an adjacent set of data block's sequential relationship to other data blocks. Other areas of the media include information indicating a beginning of media block, an end of the media block, and an early warning area. The beginning of media block is the starting location where data can be stored, while the end of media block is the last location where data can be stored. An early warning area indicates that an end of media block is approaching when the media is scanned.

In a typical random access format, data is stored in defined areas on the media. Another separate area is provided on the media containing a directory (file allocation table or FAT) indicating where the stored data is located. Because the sequential access media requires that overhead and other information be stored in a predetermined configuration and because this predetermined configuration is not present with the random access media, the two media's are incompatible.

Sequential data storage devices, such as magnetic tape streamers, are widely used with computers to back-up information stored on hard disk drives. The tape streamers are fed information from the host computer in compliance with ANSI SCSI specifications for sequential data. In the event of a failure of the hard disk drive, the backed up information on the tape is transferred back to a repaired hard drive.

With the advent of new high density storage medias such as magneto-optical disks (which is a random access media), the use of serial data storage devices may diminish. However, there is a large contingent of users that have tape streamers controlled by tape based management software which, unfortunately, is not compatible with random access devices. Thus, it would be advantageous to the large contingency of tape-based users if they could access data on a random access storage device with tape based management software.

Sequential data storage devices hold a large amount of data on the media with the storage limitations being the length of the tape. A drawback to a sequential data storage device is that typically between 20 and 200 seconds are required to access data as the device must forward the media to the location where the information to be retrieved is stored. Thus, the larger the media the larger the potential access time. Another drawback to sequential data devices is that they must be rewound to the beginning of tape before a new data storage is initiated, thereby increasing overall access and storage time.

SUMMARY OF THE INVENTION

An object of this invention is to provide a method for storing and retrieving data on a random access device in response to sequential protocol commands from a host computer.

Another object of this invention is to emulate a sequential access device with a random access device.

A further object of this invention is to partition a random access media such that information fed by a host computer to the random access media in a sequential configuration can be stored on the random access media and subsequently accessed by the host computer.

It is also an object of this invention to permit sequential access based applications software to store data on and retrieve data from a random access device.

These and other objects are provided with a method of emulating a sequential access data storage device on a random access device. In this method a host applications program provides information in a sequential format to be stored on a sequential access media including sequential access commands. The sequential access commands are transformed into random access commands to permit information in the sequential configuration to be directly stored on a random access media. The information in the random access format is stored in sequential sectors on the random access media in response to the random access commands. Preferably a dedicated file mark table area is provided on the random access media which has consecutive entries indicating locations where sets of data blocks are stored on the random access media. This data can be written and read from the random media and easily converted to a sequential format by accessing the file mark table and corresponding data.

DETAILED DESCRIPTION OF THE EMBODIMENT

Figure 1:
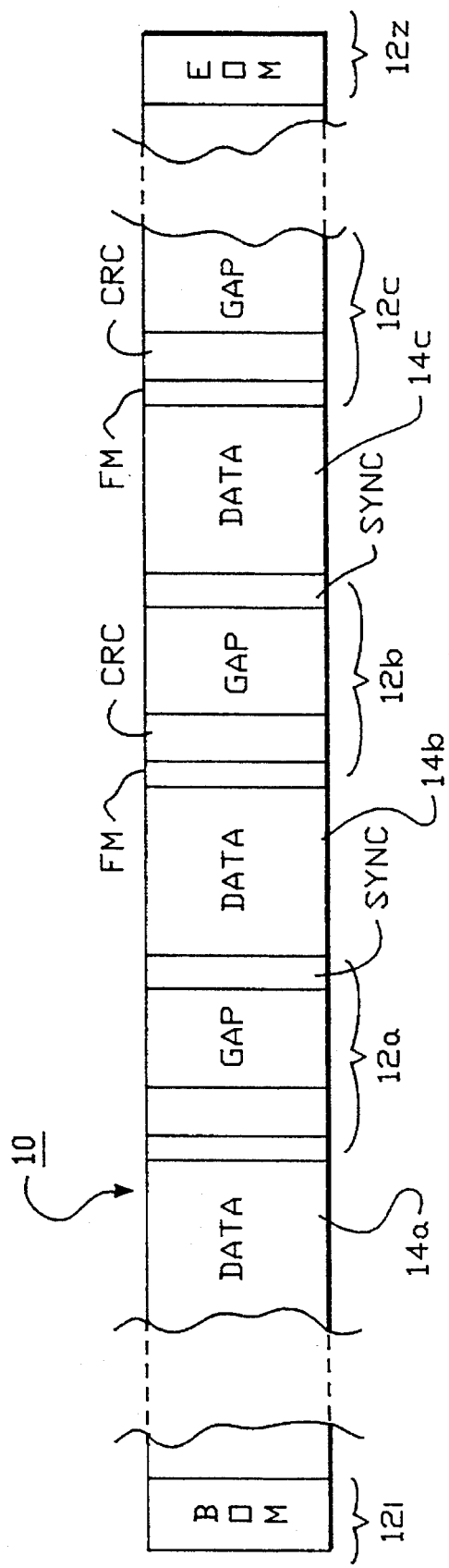
FIG. 1 is a prior art diagram illustrating the format of information storage on a sequential access media.

Referring to FIG. 1, there is shown a prior art configuration diagram of information storage on a sequential access medium 10 having an overhead areas 12a–12n positioned on the media between a plurality of adjacent data areas 14a–14n.

The overhead areas 12a–12n for a sequential access media typically include a file mark, cycle redundancy checking information, and a format area. Data areas 14a–14n typically contain the application data. Each of data areas 14a–14n are referred to as blocks, and each block conventionally has a fixed predetermined number of bytes. At the beginning of the sequential access media 10 is a sector in an initial overhead area 12i that indicates a beginning of media (BOM). At the end of the sequential access media 10 is a sector in another overhead area 12n which indicates an end of media (EOM). More details of the media configuration is described in the textbook *Streaming*, published 1982 by Archive Corp., Costa Mesa, Calif., Lib. of Congress, Catalog No. 82-072125, which is hereby incorporated by reference.

Figures 2A, 2B:
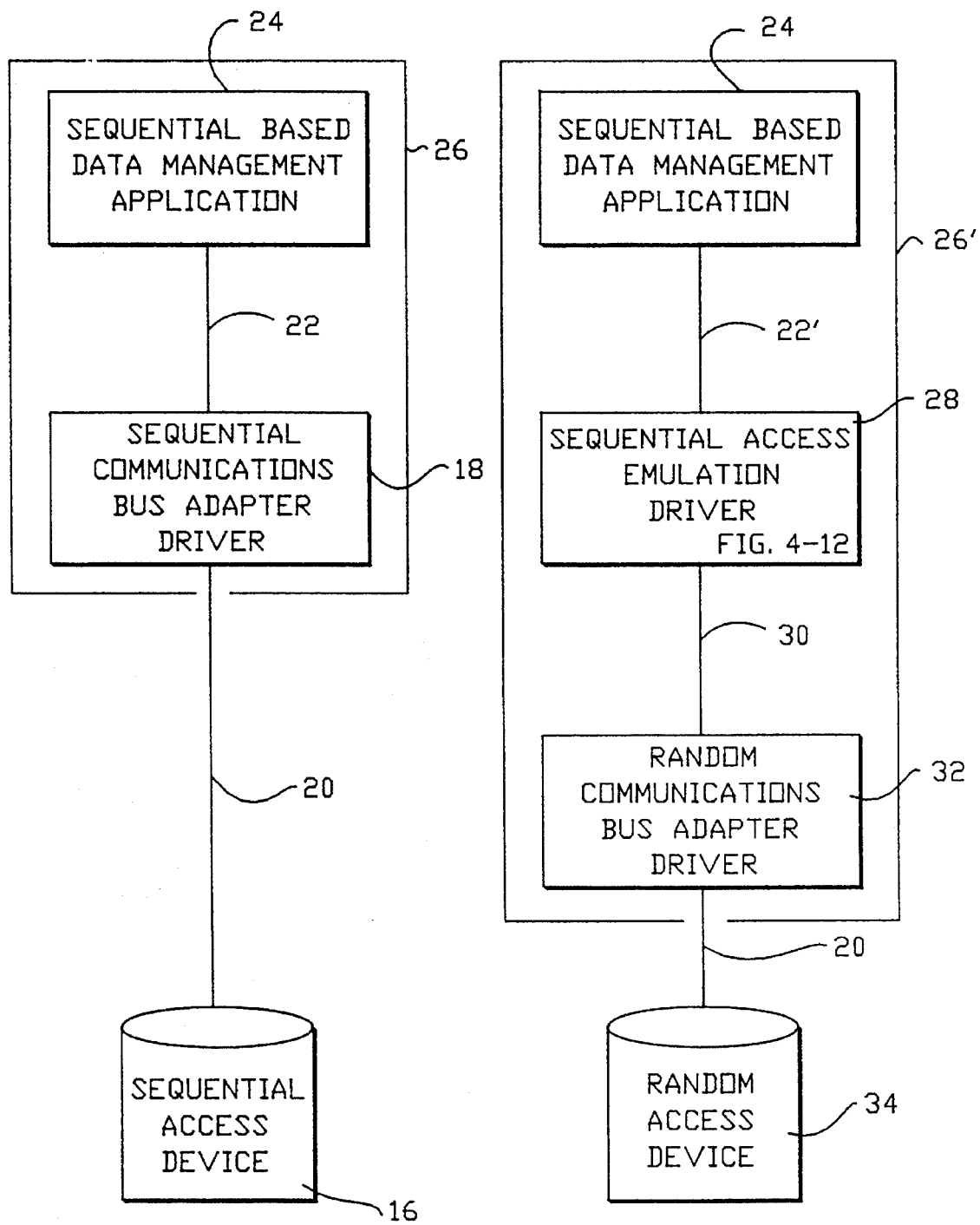
FIG. 2A is a prior art system block diagram of a conventional system having a host computer containing an application software that operates with a sequential access device.
FIG. 2B is a system block diagram of a host computer containing an application software that transfers information to a random access device using sequential access emulation in accordance with the present invention.

Referring to FIG. 2A, data is conventionally stored on the sequential access media 10 using a sequential access device 16 in response to commands and information from a communications bus adapter driver 18. The communications bus adapter driver 18 communicates to a sequential access device over a system communications bus 20. The communications bus adapter driver 18 is controlled over a high level sequential access device interface 22 with a sequential based data management application 24, i.e., an application program. The sequential based data management application 24 is typically written in a high level language while the communications bus adapter driver is written in an assembler code to control sequential access device 16. The sequential based data management application 24 and communications bus driver 18 are typically part of a program in a host computer 26. The communications bus adapter driver 18 is normally one of many drivers that are provided with the management application 24.

Referring to FIG. 2B, there is shown a second host computer 26' in accordance with the invention. In the second host computer 26', the sequential based data management application 24 feeds commands to process information in the configuration shown in FIG. 1 for a write, and other commands which will be described in FIGS. 4–12, to a sequential access emulation driver 28. Driver 28 responds to commands from application 24 by transforming the commands from application 24 into commands that can store the information on the random access device 34. Driver 28 also responds to other commands from application 24, details of which will be explained in connection with FIGS. 4–12.

These transformed commands are fed via a sequential to random access translation interface bus 30 to a communications bus adapter driver 32. The communications bus adapter driver 32 is a conventional type of communications bus adapter driver for driving random access devices. Communications bus adapter driver 32 responds to the transformed commands from sequential access emulator driver 28 by feeding the commands and information signals over a system communications bus 20 to random access device 34. In one example, application 24, driver 28, and driver 32 are located in host computer 26'.

Figure 3:
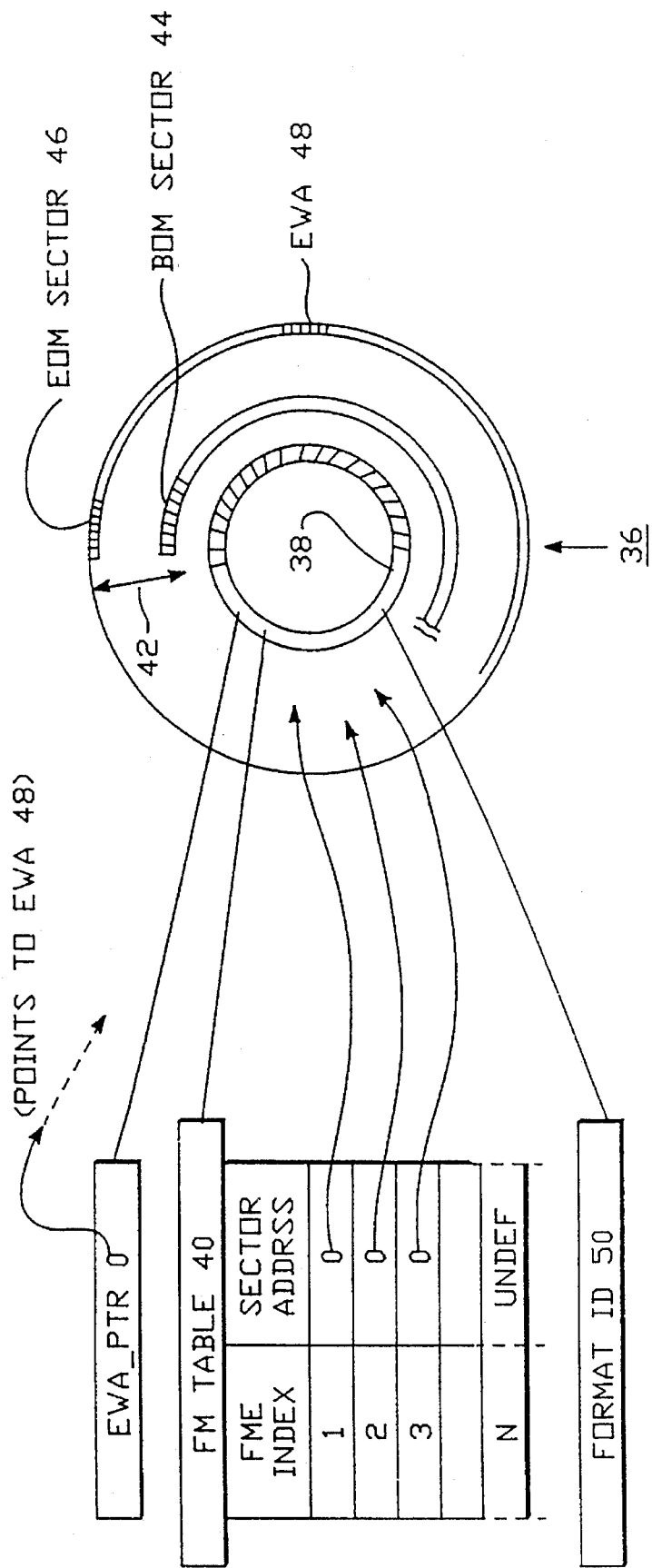
FIG. 3 is a diagram illustrating a physical format of the random access media in accordance with the invention.

Referring to FIG. 3, there is shown a diagram of a preferred configuration in which sequentially formatted information is stored on a random access media. Random access media 36, such as a magneto-optical disk, has a plurality of concentric tracks on the media. These tracks are typically numbered on the media starting from an inside track to an outside track. A file mark table (FMT) area 40 is allocated on an inside circular track 38.

Data and other information is stored on the random access media 36 in application data area 42, which area 42 is formatted into pie-shaped sectors. Data is stored on the random access media as files containing one or more blocks. The application data area 42 has a beginning of media sector 44 where the first location of data is stored, and an end of media sector 46 which is identified as the last location where data can be stored on the random access media 36. An early warning area 48 within the application data area indicates when accessing the random access media 36 that the end of media sector 46 is approaching. The address of the early warning area 48 is preferably stored on media 36 before file mark table area 40. An end of data sector (not shown) is located on the random access media 36 between the beginning of media sector 44 and the end of media sector 46 to denote the location where data is no longer present on the media 36. A format I.D. sector 50 is provided at the end of file mark table area 40 to indicate the formatting scheme of the random access media 36.

File mark table area 40 contains an index of starting addresses indicating the sector where corresponding sets of data blocks or files of data are stored on the random access media 36 in the application data area 42. Optionally, an ending address that indicates where a last block set or file is stored may be recorded on the media. The starting addresses of the files are positioned in consecutive entries within the file mark table area 40. This index of starting addresses will herein be referred to as the FME_Index. In table area 40, FME_Index=1 is the first entry in table 40, and FME_Index=2 is the second entry. The entries continue in numerical sequence. Preferably, each FME_Index corresponds to a file mark on the sequential access media. For example, the address positioned within FME_Index=1 is the location of the first file of data. FME_Index=2 indexes the second file of data. The file mark table provides an index of the addresses on the disk each indicating the start of the next file that will be encountered when accessing data on the random access media 36. The current accessing location is herein referred to as a current access block position.

As previously stated the file mark table index (FME_Index) indicates the starting address of respective files within the application data area 42. When accessing the media 36 and encountering an end of data sector, the content of FME_Index for the sectors for the application data area 42 between the end of data sector and the end of media sector 46 will be undefined. Accordingly when accessing file mark table 40 in the media 36 and encountering the content of FME_Index being undefined, an indication will be noted that the media is empty or the current logic position being accessed is past the end of data sector.

Referring now to FIGS. 4–12, generally in sequence, the operation of the software in driver 28 to access the random access media 36 in response to sequentially formatted information shown and commands provided by application 24 will now be described.

For the purposes of discussion "CLB" will be defined as current logic block position of a sequential media that is intended to be accessed by the next read\write\write file mark application. "FME_INDEX" will be defined as the index into the file mark table and the bracketed notation "(FME_Index)" will be defined to be the contents of the entry of the index FME_Index in the file mark table and will be generally referred to as the file mark address. This file mark address represents the logical block position of the start of the next virtual file after the current logical block position.

The sequential emulation driver 28 begins after called or interrupted by the sequentially based data management application 24 and being fed a command from driver 28. A typical command is a media access command which modifies the information on the media. Such commands include read, write or change the current logical block position of the data to be accessed next, such as locate, rewind, etc. Other types of commands from driver 28 are non-media access commands, such as TESTING or READY. Non-media access commands are relayed directly to communications bus adapter driver 32 unmodified by the emulation driver 28. The flow charts in FIGS. 4–12 are diagrams of response by driver 28 to the mandatory media access commands for sequential access drives to comply with ANSI-SCSI specifications. Other media access commands such as copy, verify, read reverse, etc. are optional and need not be implemented. It is not intended that the invention be limited to responding to the mandatory media access commands, and that option commands may be responded to although flow charts for executing the option commands are not shown.

Figure 4:
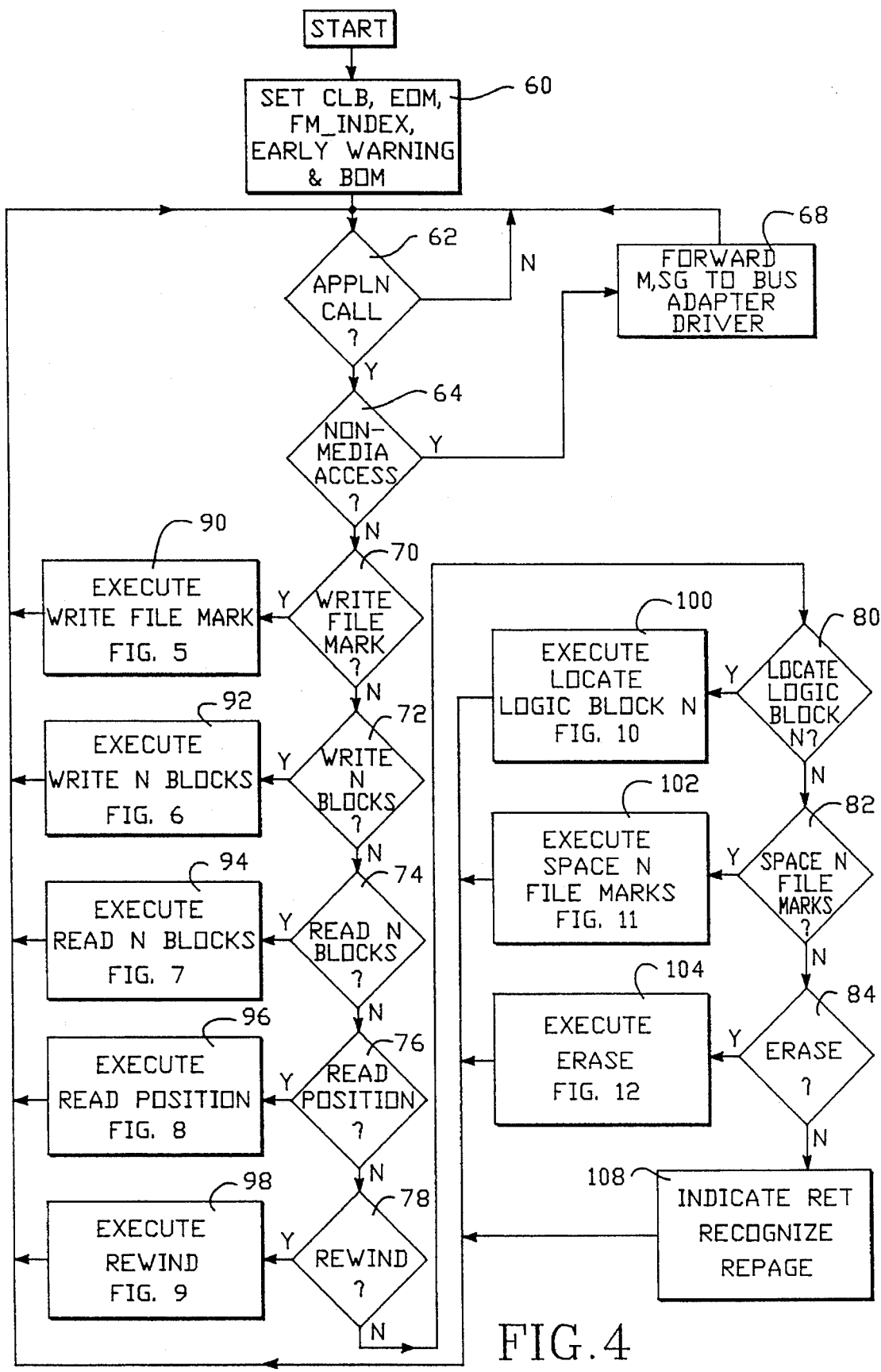
FIGS. 4–12 are flow charts of the sequential access emulation driver show in FIG. 2B in accordance with the invention.

Driver 28, shown in FIG. 4, begins on a call command by the computer in application 24 although it could be initiated on an interrupt. At 60, the current logic block (CLB), the end of media location (EOM), the FME_Index, the starting address of early warning area 48 and the beginning of media (BOM) sector are set to initial values. Once set, step 62 is executed.

At 62, it is determined if driver 28 was called from the application 24. If there was a call from the application, step 64 is executed. Otherwise, step 62 cycles until driver 28 is called.

In step 64 it is determined whether the call from application 24 is a media or a non-media access. If the call (message or command) is a non-media access, the message is sent directly to the bus adapter driver 32 by way of block 68, and the program returns to step 62. If the message from the application is a media access command, step 70 is executed.

In steps 70–84 it is determined whether the message is a write file mark, a write n block, a read n block, a read position, a rewind, a locate logic block, a space n file mark, or an erase. If the emulation driver 28 detects that one of the commands sent by the application 24 is one of those in steps 70–84, the program steps to one of the execute blocks 90–104 and executes the command, thereafter returning to a ready state at block 62. Details of these command blocks 90–104 are set forth in FIGS. 5–12.

If the received message does not correspond to one of the commands in blocks 70–84, a non-recognized response is returned at block 108 to application 24 and the program returns to block 62.

Figure 5:
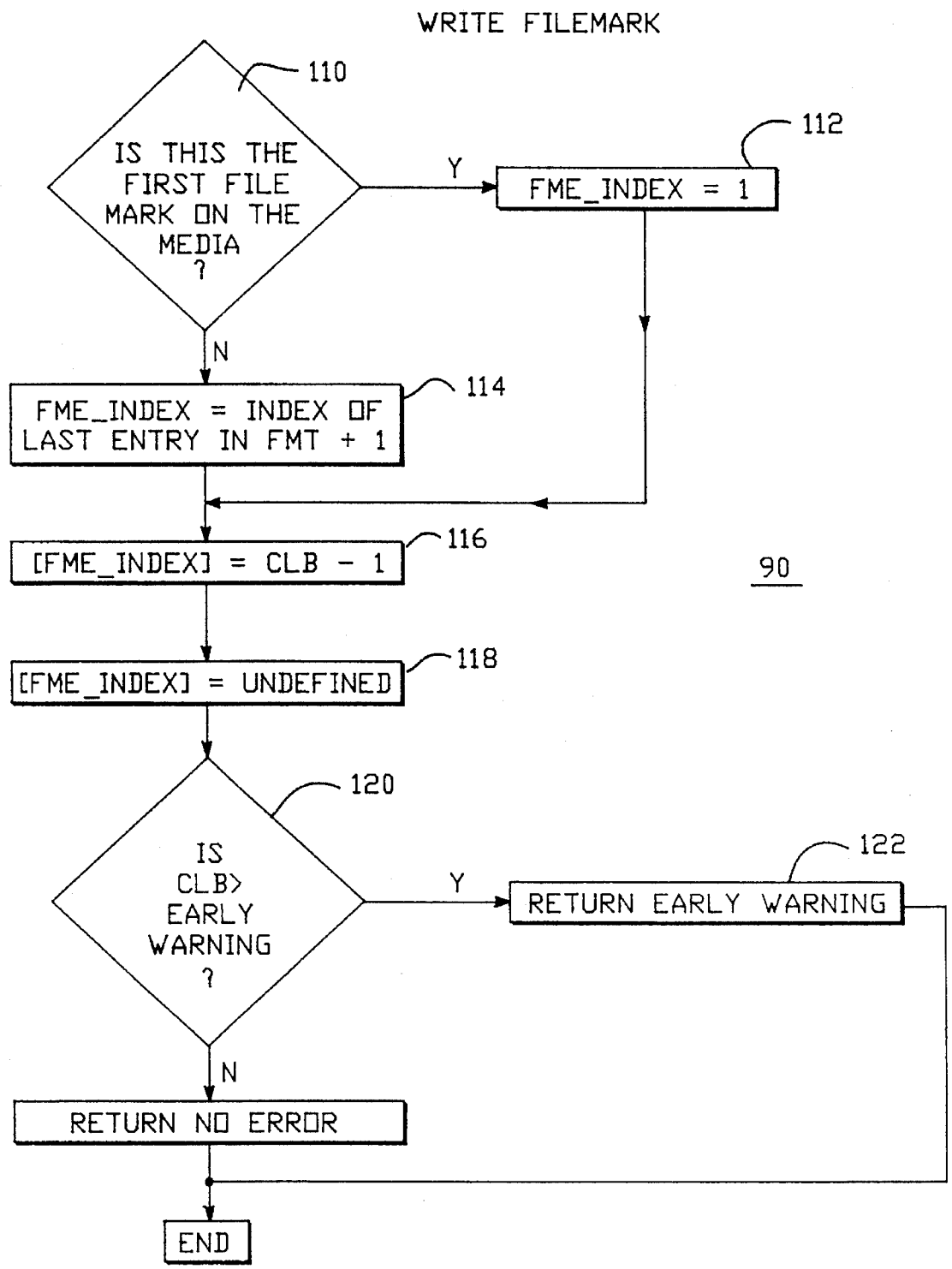

Referring to FIG. 5, in the execute write file mark block 90, the program determines at block 110 if only a first file mark is on media 36. If only a first file mark is on media 36, FME_Index=1 is set at block 112. If other than a first file mark is on the media, the file mark index is set to the index of the last entry of the file mark table plus 1, block 114. After setting the file mark index, the content of the present FME_Index location is set to the current logical block (CLB) position less one at block 116, i.e. the new FME_Index value is written to the media.

At block 118, the FME_Index variable is set to "undefined" indicating that a file mark has been written to media and that further data can be written. If FME_Index is defined, data transfer is inhibited. At block 120 it is determined whether the current logical block position is within the early warning addresses area on the random access media. If the current logical block position is within the early warning area an early warning indication is returned at 122. If the current logical block position is not in the early warning area, a no error is returned at 124 and the write file mark routine 90 ends.

Figure 6:
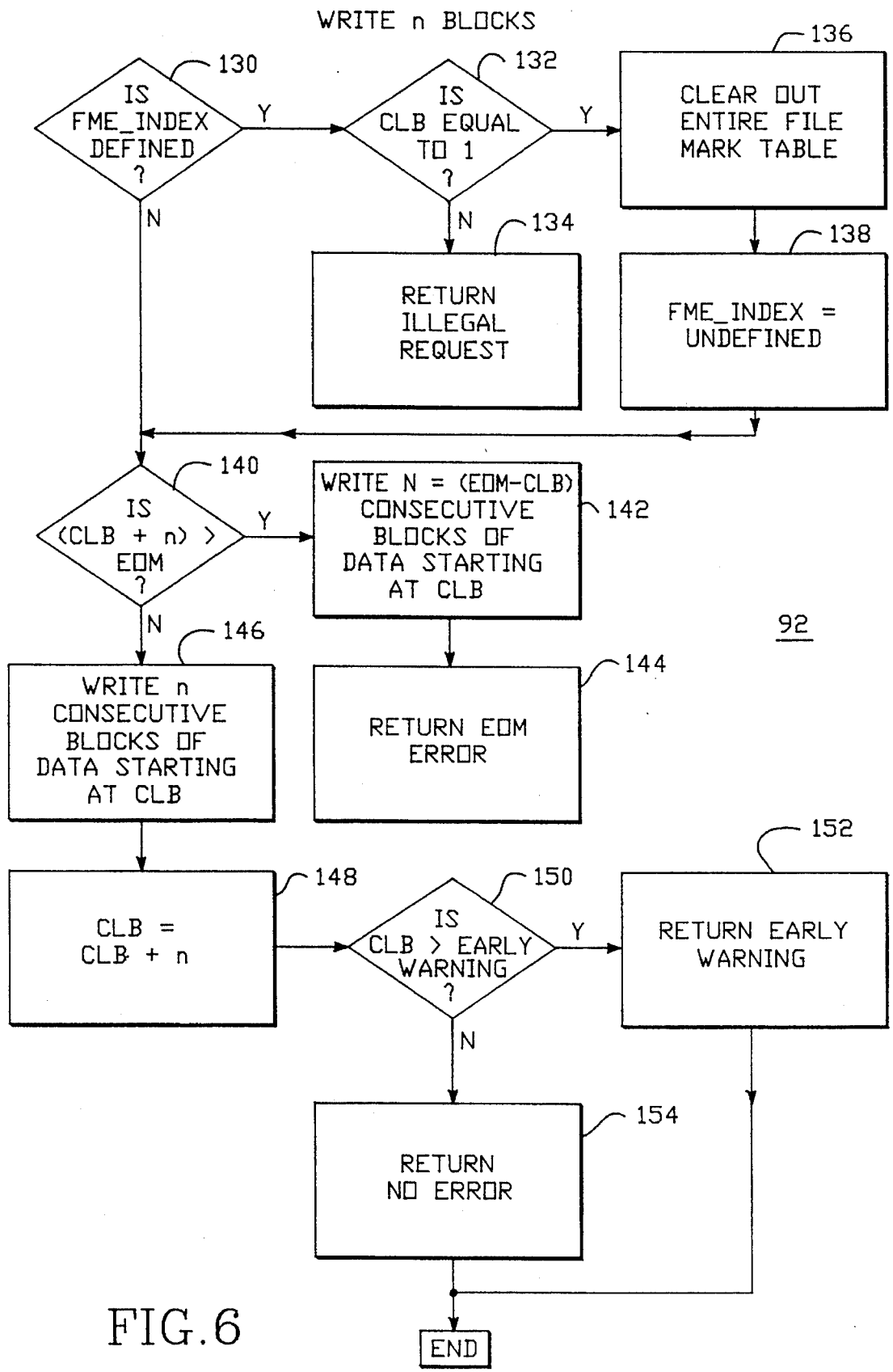

Referring to FIG. 6, the write n blocks routine 92 begins at 130 where it is determined whether the current FME_Index is defined. The "n" term is hereafter defined as an integer provided by application 24. If the current FME_Index is defined, it is determined if the current logical block is equal to one at 132. If the current logical block is not equal to one, an illegal request error is returned at 134 and the write routine 92 ends. If the current logical block position equals one, the entire file mark table area 40 is cleared at 136 and the FME_Index is set to "undefined" at 138.

If the FME_Index is undefined, block 130, or after executing block 138, it is determined whether the current logical block position plus n (provided by application 24) is greater than the address at the physical end of media sector at 140. If the current logical block plus n is greater than the physical end of media address, then a number (N) of consecutive blocks of data is written to the data area 42 starting at the current logical block at 142 where N is defined as the difference between the address of the current logical block position and the address of the physical end of media sector 46. After step 142 is executed, an end of media error is returned at 144.

If the address of the current logical block position plus n is not greater than the address of the end of media sector 46, then n consecutive blocks of data are written starting at the current logical block, step 146.

At block 148 the logical block (CLB) position is set to the current logical block position plus n. It is determined whether the current logical block is within the early warning area 48, block 150, and if so, an early warning indication is returned to application 24, block 152. If the current logical block position is not within the early warning area 48, no errors are returned at 154 and the write n blocks routine 92 ends.

Figure 7:
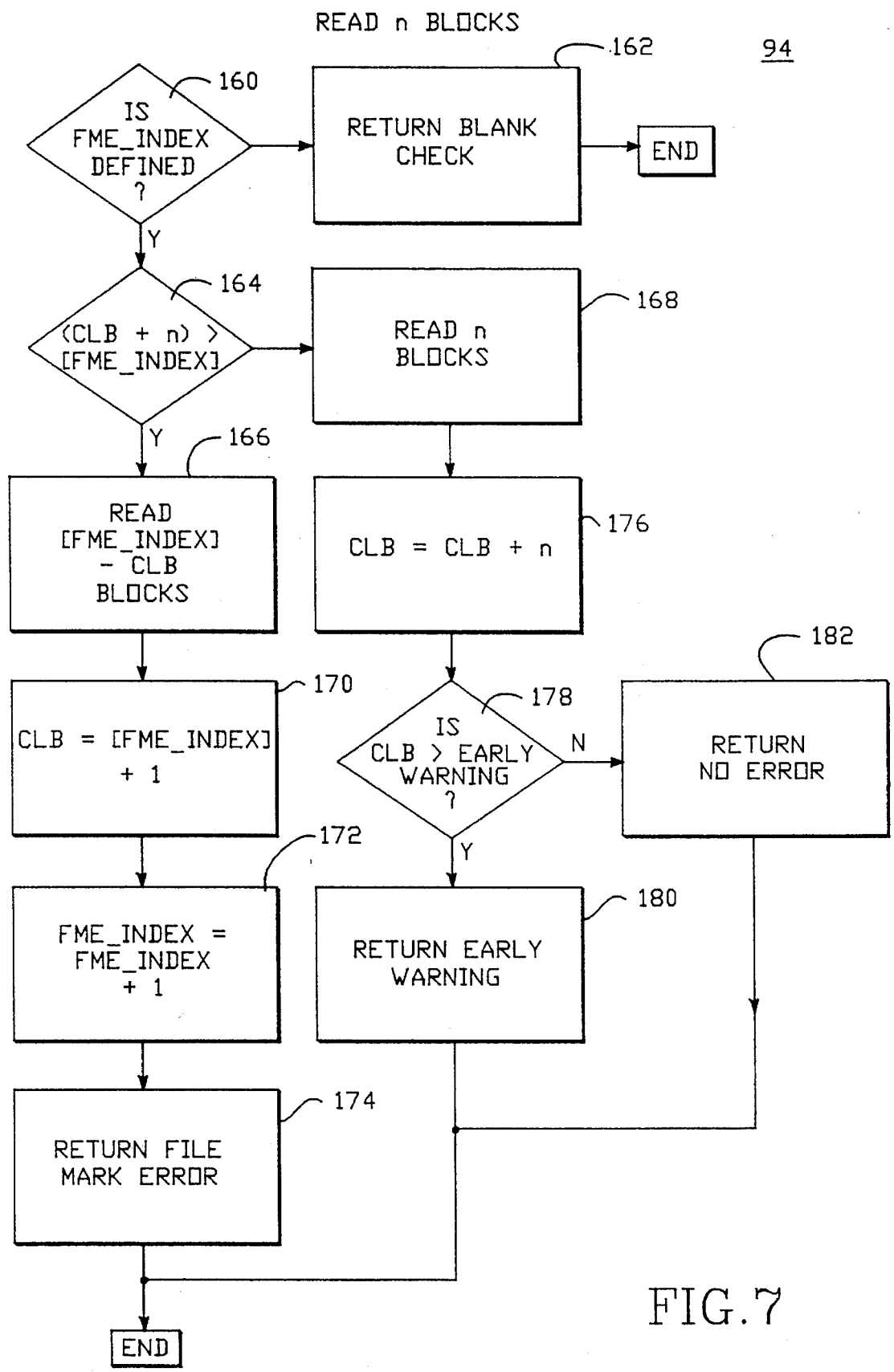

The read n blocks routine 94 is shown in FIG. 7 beginning with determining whether the FME_Index is defined, block 160. If the FME_Index is not defined, either the media is empty or the current logical block is past the end of data, and a blank check indication is returned at block 162.

If the FME_Index is defined, block 160, it is determined whether the current logical block position plus n is greater than the address in the current FME_Index in the file mark table area 40, block 164. If the current logical block position plus n is greater than FME_Index, step 166 is executed. If the current logical block position plus n is not greater than the contents of the FME_Index, then the step 168 is executed.

At step 166 the address in the current FME_Index minus the address of the current logical block is read. The current logical block position is set to the FME_Index plus one at step 170. The FME_Index is set equal to the current FME_Index plus one at step 172 and a file mark error indication is returned at step 174.

After reading n blocks in step 168, the current logical block position is set equal to the current logical block position plus n at step 176. At step 178 it is determined whether the current logical block position is within the early warning area 48. If so, the early warning indication is returned at step 180; and if not, a no error indication is returned at step 182. After each of steps 162, 174, 180 and 182, the read n blocks routine 94 ends.

Figure 8:
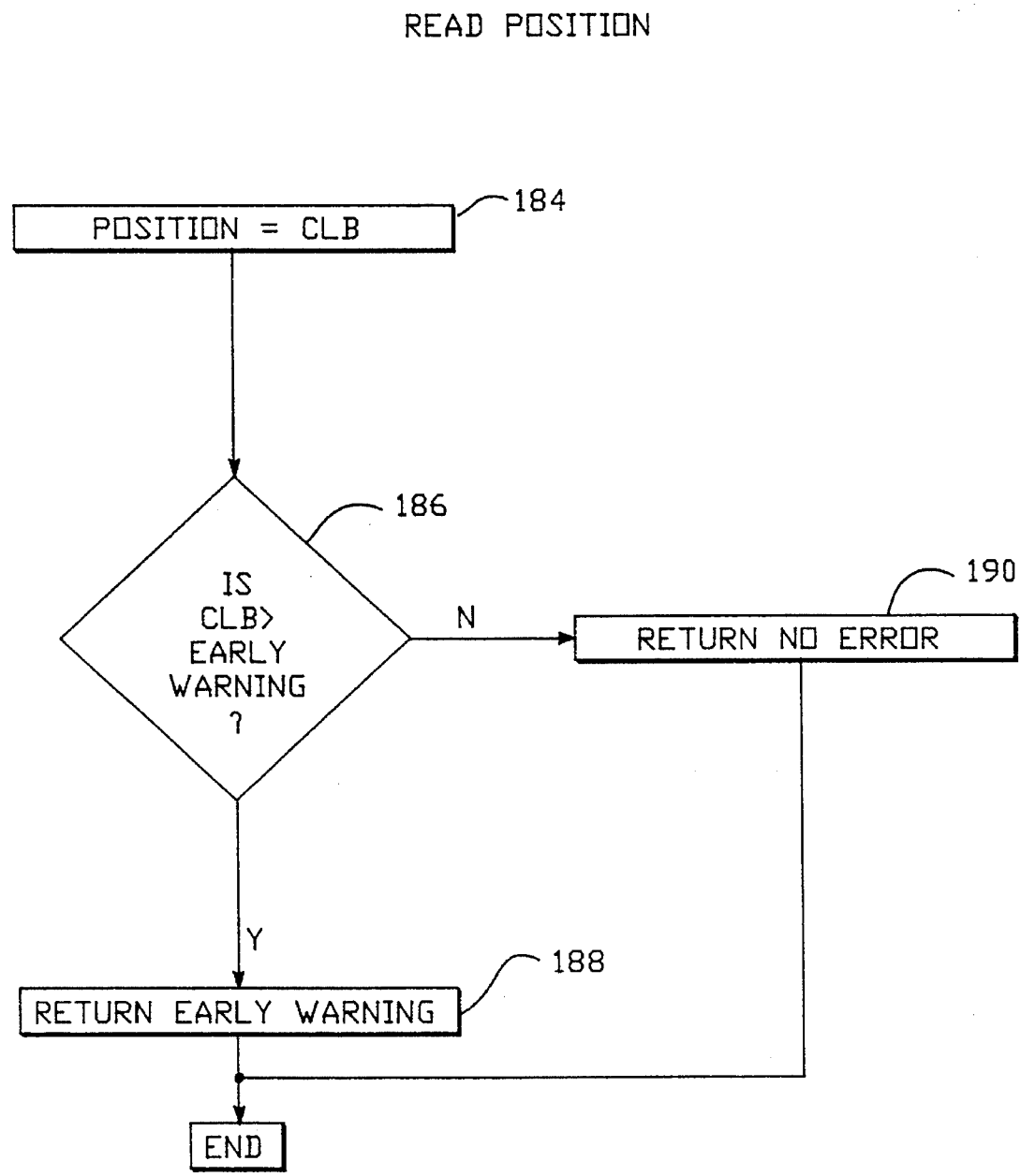

Referring to FIG. 8, the read position routine 96 begins at step 184 where the position of the device reading media 36 is set to the current logical block position. Then at step 186 it is determined whether the current logical block position is within the early warning area 48. If so, an early warning indication is returned at step 188. If not, no early warning indication is returned, block 190, and read position routine 96 ends.

Figure 9:
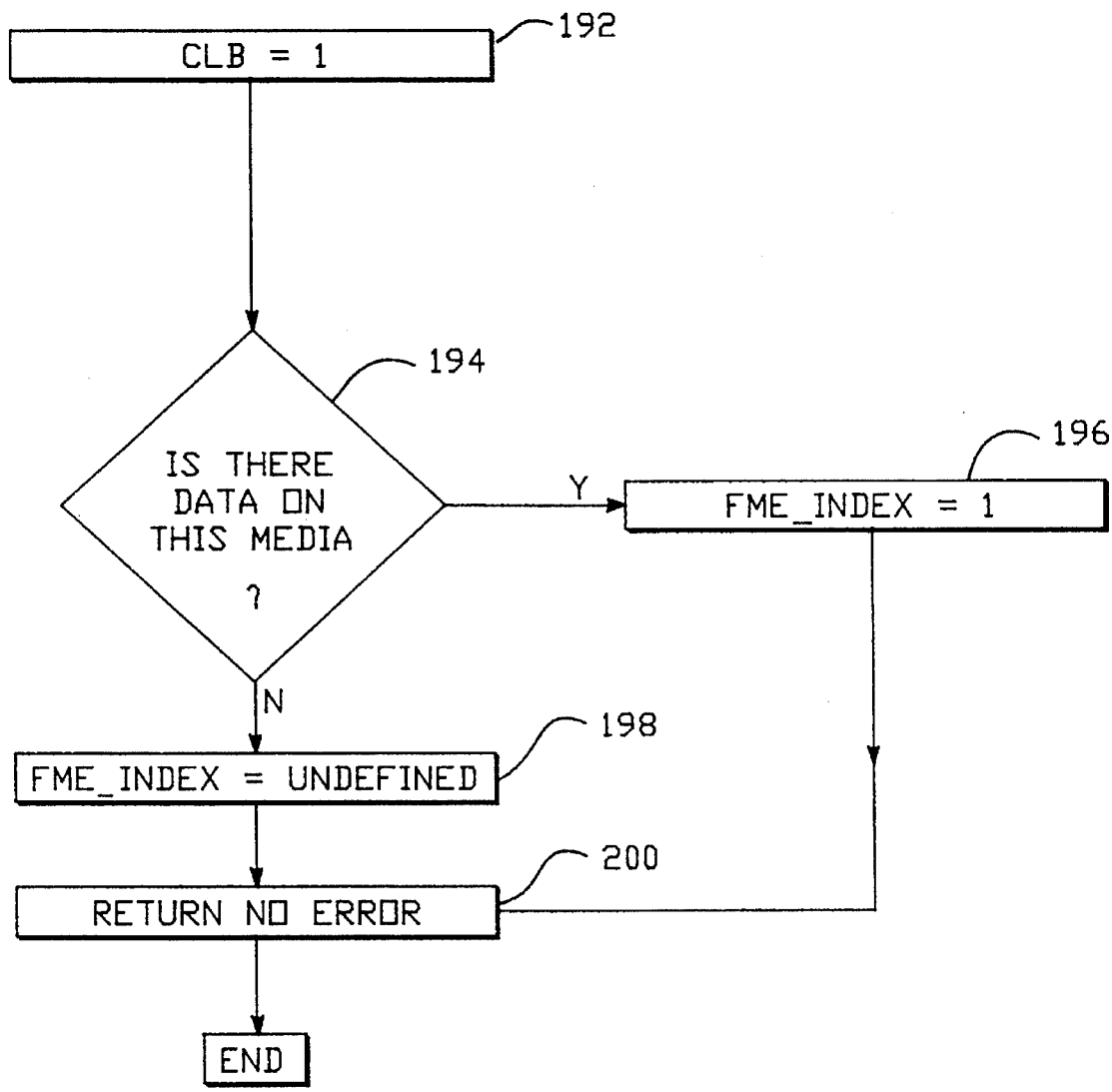

Referring to FIG. 9, rewind routine 98 is shown starting at step 192 where the current logical block position is set to one. After setting the current logical block to one, it is determined at step 194 whether there is data on the media 36 by reading the contents of the FME_Index in file mark table 40. If there is data on this media 36, the FME_Index is set equal to one, block 196. If there is no data on media 36, FME_Index is set to undefined at step 198. After executing steps 196 and 198, a no error is returned at step 200 and rewind 98 ends.

Figure 10:
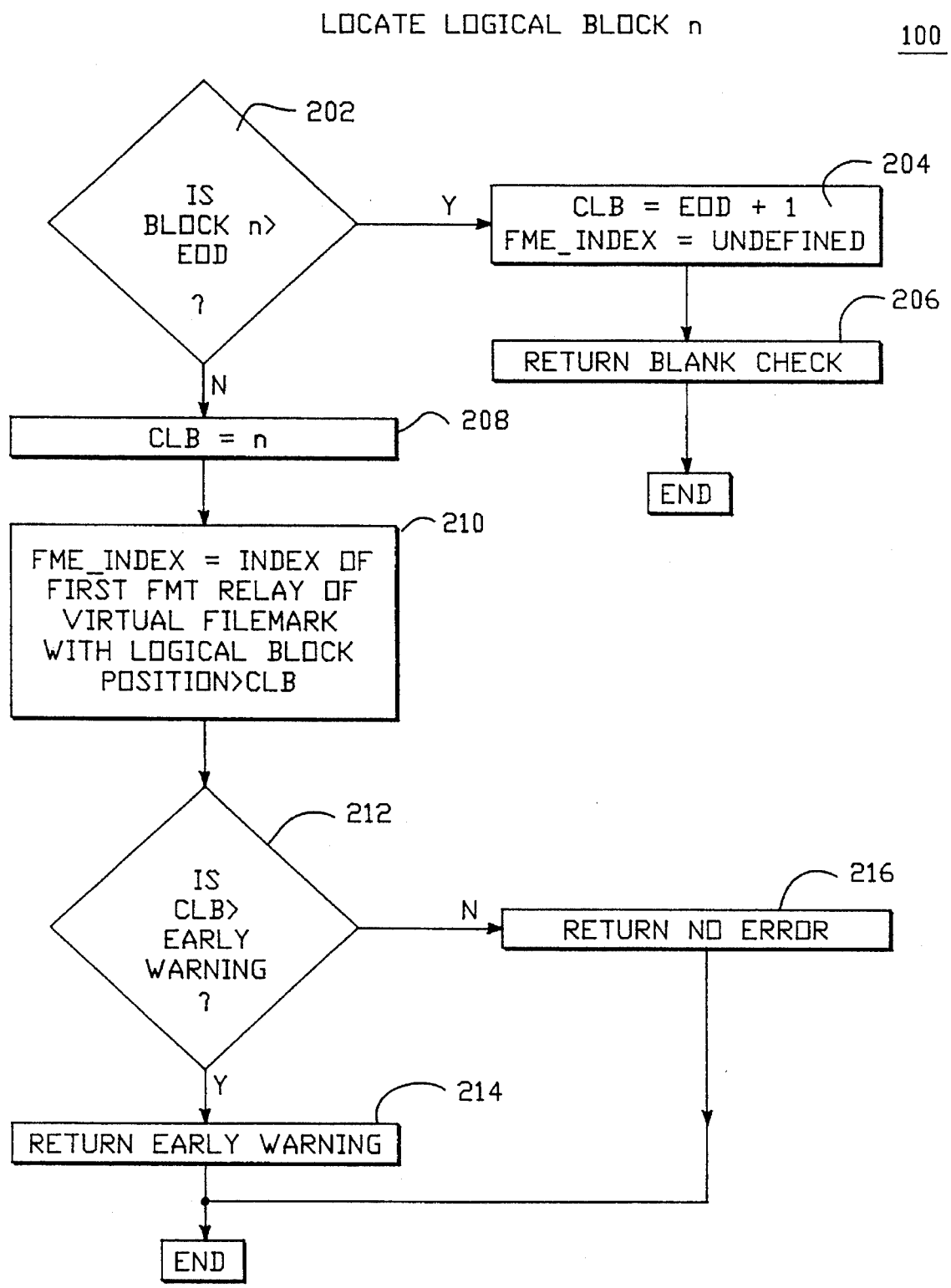

Referring to FIG. 10, there is shown the locate logical block n routine 100 which starts at step 202. At step 202 it is determined whether the address of block n is greater than the end of the data sector address. If it is, at step 204 the current logical block is set to the end of data address plus one and the FME_Index is set to "undefined". A blank check indication is returned at 206 and locate logic block n routine 100 ends.

If block n is not greater than the end of data sector at 202, the current logical block is set equal to n, block 208. At step 210 the FME_Index is set to the first formal entry of a file mark with a logical position (address) greater than the address of the current logical block.

At step 212 it is determined whether the address of the current logical block is greater than the address of early warning area 48. If so, an early warning indication is returned at step 214. Otherwise, a no error is returned, step 216. After steps 214 and 216, locate logical block routine 100 ends.

Figure 11:
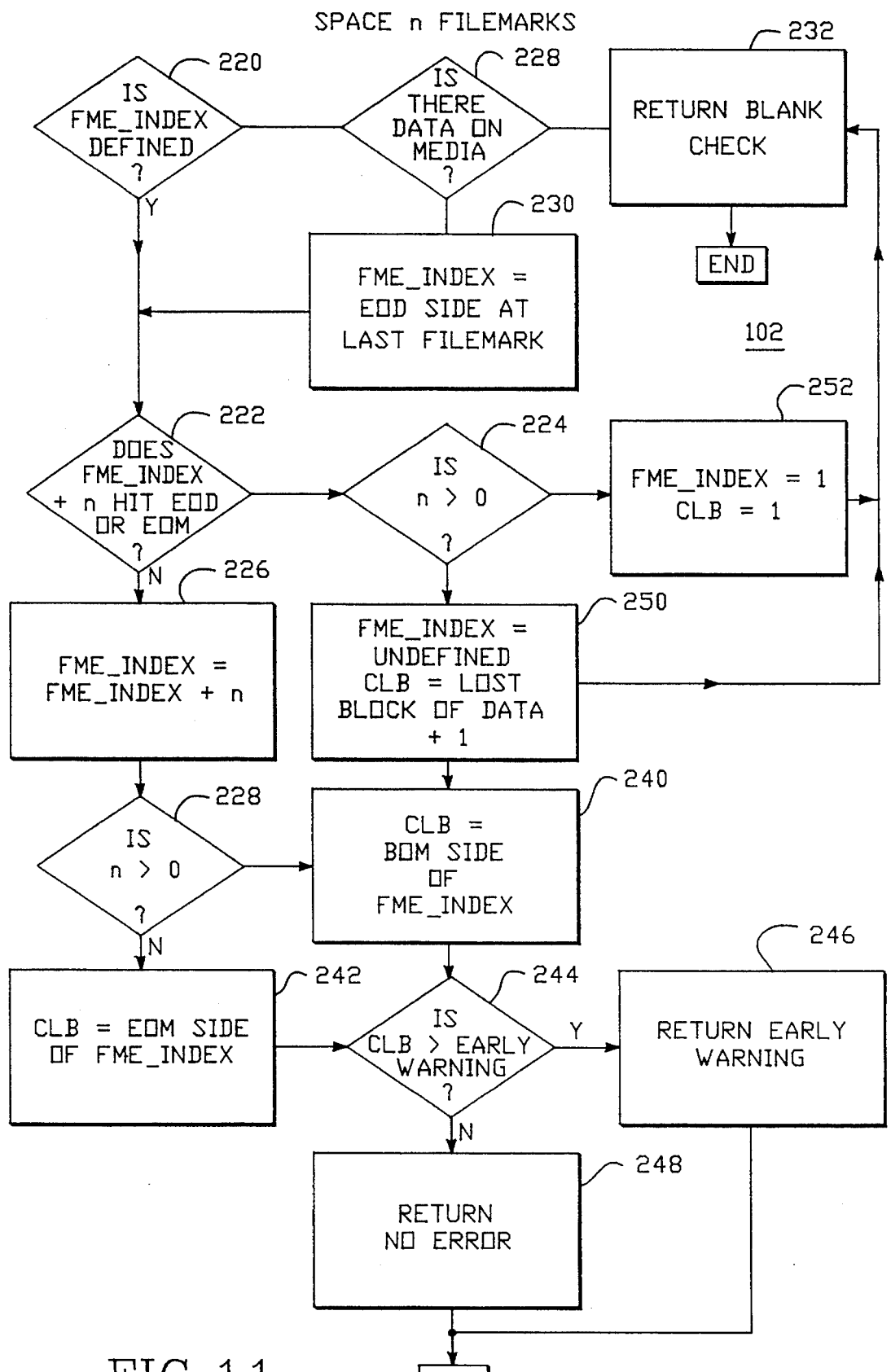

Referring to FIG. 11, a flow chart for space n file marks routine 102 is shown starting at step 220 where it is determined whether the current FME_Index is defined. If the current FME_Index is defined, it is determined whether the FME_Index plus n matches the address of the end of data or end of media sector, block 222. If there is a match, the program steps to block 224. If there is no match, the program steps to block 226. If the FME_Index is not defined, block 220, then it is determined whether there is data on the media 36, block 228. If there is data on the media 36, the FME_Index is set to equal the end of data side of the last file mark, block 230, and the program branches back to step 222. If there is no data on media 36, a blank check indication is returned, step 232. After step 232, the routine 102 ends.

At step 226 the FME_Index is set to the current FME_Index plus n, and then it is determined at step 228 whether n is positive. If n is positive the current logical block position is set to the address immediately proceeding FME_Index, step 240. If n is negative, the current logical block is set to the address immediately following FME_Index, step 242. After executing steps 240 and 242, it is determined at step 244 whether the current logical block (CLB) is outside or inside the early warning area 48. If CLB is inside the early warning area 48, an early warning indication is returned, step 246. If the CLB is outside area 48, a no error indication is returned, step 248.

If at step 224, n is greater than 0, the FME_Index is set to "undefined", step 250 and the current logical block is set to the last block of data plus one. If n is negative, then the FME_Index is set to one and the current logical block position is also set to one, step 252. After steps 246, 248, and 232, space n file marks routine 102 ends.

Figure 12:
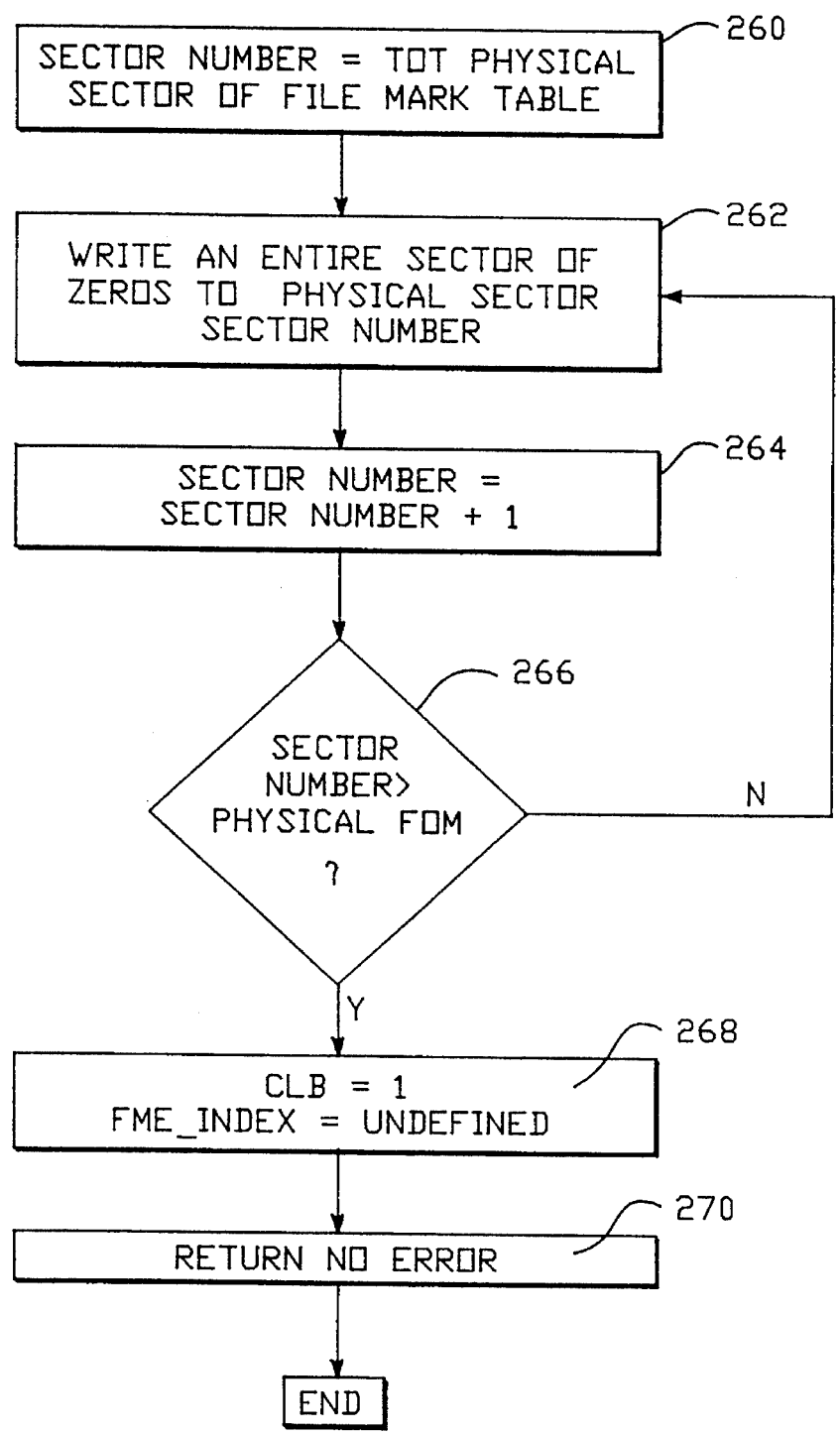

Referring to FIG. 12, erase routine 104 starts at block 260 where a variable "sector_number" is set to the address of the last physical sector of the file mark table area 40. Then, at step 262, an entire sector of zeros is written to the physical address of "sector_number".

At step 264 "sector_number" is incremented by one, and at step 266 it is determined whether "sector_number" is greater than the address of the physical end of media sector. If the sector number is greater than the address of the physical end of media sector, then step 268 is executed. At step 268 the current logical block position is set to one and the FME_Index is set to undefined. However, if the "sector_number" is less than the address of the physical end of media, then step 262 is repeated. After executing step 268, a no error indication is returned at step 270 and erase routine 104 ends.

This concludes the description of the preferred embodiments. A reading by those skilled in the art will bring to mind various changes without departing from the spirit and scope of the invention. The scope of protection sought is to be accordingly defined in view of the following appended claims and a reading by those skilled in the art of the corresponding portions of the preceding specification.

What is claimed is:

1. A machine-implemented method of emulating access to a hypothetical sequential access data storage device while actually using a random access storage device, the method comprising the steps of:

(a) providing in conjuction with execution of an applications program within a host computer, information in a sequential configuration suitable for storing on a sequential access media;

(b) generating by execution of said applications program in the host computer, a plurality of sequential access commands including commands for transferring desired portions of said sequentially-configured information between the hypothetical sequential access storage device and the host computer;

(c) transforming the sequential access commands, outside of said applications program, into random access commands to thereby permit the sequentially-configured information to be written to or read from a random access media driven by said random access storage device; and (d) transferring the random access commands to the random access storage device;

wherein said step (b) of generating includes the substep of:

(b1) providing a read sequential access command that requests a reading of a number, n, of blocks following a current position (CLB) from sequentially-configured information that is hypothetically pre-stored in the hypothetical sequential access device;

wherein the step (c) to transforming includes the substeps of:

(c1) testing the number of requested blocks, n, to see if the requested number, n, extends beyond the end of a hypothetical sequential file hypothetically pre-stored in the hypothetical sequential access device, said testing including using file mark position information pre-stored on the random access media, the file mark position information indicating the position of a hypothetical file mark along sequentially-arranged information pre-stored on the random access media; and (c2) producing a random access command, in response to said testing, for reading from the random access storage device a number of data blocks equal to the lesser of n or the number of data blocks till the end of the hypothetical sequential file.

2. The method as recited in claim 1, further comprising the steps of:

(e) prior to reading or writing said sequentially-configured information respective from or to the random access media, partitioning the random access media into a plurality of areas including a data-blocks area and a file mark table area; and (f) prior to writing a set of blocks of sequentially-configured information to the random access media, indicating in the file mark table area, a position on the random access media of a hypothetical file mark associated with the set of blocks.

3. The method as recited in claim 2 wherein for the case where plural file marks are to be hypothetically written, said step (f) of indicating includes:

sequentially placing in the file mark table area, the respective positions of relative plural but hypothetical file marks.

4. A method of emulating access to a sequential data storage device while actually accessing random access media within a random access device, the method comprising the steps of:

providing two or more data sets each having a plurality of blocks of data;

providing with each of the data sets, an associated overhead block containing a file mark that indicates a relative position of the associated data set with respect to the other of the two or more data sets;

storing the plurality of blocks of data of each data set in consecutive sectors in a data area of said a random access media; and for each data set stored in the data area, placing an entry into a file mark table area of the random access media, said entry indicating a position of a hypothetical file mark associated with the data set stored in the data area.

5. A method of emulating access to a sequential data storage device while actually accessing random access media within a random access device, the method comprising the steps of:

defining on the random access media, a file mark table area having a plurality of entries;

defining an application data storage area on another portion of said random access media;

designating as a current logic block position, a position within said application storage area over which the hypothetical sequential access data storage device is hypothetically poised;

generating within a host computer a first command to store a first predetermined number $n_1$ of blocks of data on the random access media;

writing $n_1$ consecutive blocks of data on to the media at the storage area starting at the current logic block in the storage area; and after writing the $n_1$ consecutive blocks, incrementing the current logic block designation by $n_1$ blocks.

6. A machine-implemented method for making it appear to a sequentially-based program executing in a host computer that the program is communicating with a sequential storage system having file marks (FM) for indicating the start of respective, sequential sets of data blocks, when in actuality the program is communicating with a random access storage system that is operatively coupled to the host computer, said method including the steps of:

(a) creating within the random access storage system, a file mark table for storing location information indicating hypothetical storage positions, in the random access storage system, for hypothetical file marks each associated with the storage start position of a corresponding set of one or more data blocks for which the hypothetical file mark would be recorded in the sequential storage system, the file mark table thereby indicating the start positions within the random access storage system of corresponding sets of data blocks, and in response to file-mark based sequential access requests generated by the sequentially-based program, using the file mark table to emulate with the random access storage system, a response that the sequential storage system would have provided for the request.

7. A computer system comprising:

execution means for executing a sequential-based data access program, the sequential-based data access program expecting to sequentially scan past one or more file marks associated with a corresponding one or more sets of sequentially-configured data blocks stored on a sequential access medium;

interface means for interfacing with a random access storage device having a random access media; and emulator means, operatively coupled to the execution means and to the interface means, for transferring data between the execution means and the interface means while emulating the presence of said one or more file marks between sequentially-arranged blocks of data stored on the random access media although such one or more file marks are not physically positioned between the sequentially-arranged blocks of data.

8. A machine-implemented emulation system comprising:

sequential interface means for receiving sequential access commands from a sequential-based data access means, said sequential access commands including file-mark based commands that expect to sequentially scan past one or more file marks associated with a corresponding one or more sets of sequentially-configured data blocks;

random access interface means for interfacing with a random access storage device; and file mark mimicking means, operatively coupled to the sequential interface means and to the random access interface means, for mimicking the presence of one or more hypothetical file marks, hypothetically positioned relative to sequentially-arranged blocks of data stored on random access media and for accordingly transferring information between the sequential interface means and the random access interface means.

9. An emulation system according to claim 8 wherein the file mark mimicking means includes:

file mark position recording means for maintaining a file mark table in which is recorded the hypothetical positions of said one or more hypothetical file marks relative to the sequentially-arranged blocks of data stored on the random access media.

* * * * *